United States Statutory Invention Registration [19]

[11] Reg. Number: H756

Boettcher [43] Published: Mar. 6, 1990

[54] RADIATION HARD VACUUM SWITCH

[75] Inventor: Gordon E. Boettcher, Albuquerque, N. Mex.

[73] Assignee: The United States of America as represented by the United States Department of Energy, Washington, D.C.

[21] Appl. No.: 221,072

[22] Filed: Jul. 19, 1988

[51] Int. Cl.[4] ..... H01J 17/04; H01J 17/16; H01J 17/30

[52] U.S. Cl. ..... 313/603; 313/602

[58] Field of Search ..... 313/603, 602, 231.41, 313/231.51

[56] References Cited

U.S. PATENT DOCUMENTS 3,303,376 2/1967 Lafferty ..... 313/603 X

*Primary Examiner*—Thomas H. Tarcza
*Assistant Examiner*—Linda J. Wallace
*Attorney, Agent, or Firm*—George H. Libman; James H. Chafin; Judson R. Hightower

[57] ABSTRACT

A vacuum switch with an isolated trigger probe which is not directly connected to the switching electrodes. The vacuum switch within the plasmatron is triggered by plasma expansion initiated by the trigger probe which travels through an opening to reach the vacuum switch elements. The plasma arc created is directed by the opening to the space between the anode and cathode of the vacuum switch to cause conduction.

4 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

RADIATION HARD VACUUM SWITCH

The Government has rights in this invention pursuant to Contract No. DE-AC04-76DP00789 awarded by the U.S. Department of Energy and AT&T Technologies Inc.

BACKGROUND OF THE INVENTION

The present invention relates to a radiation hard vacuum switch and more specifically to a radiation hardened closing switch for a applied between an anode lead and a cathode lead.

Circuit designers require a radiation-hard system to couple a trigger signal into an exclusion region without wires and with several kilovolts of isolation so that a capacitor discharge circuit can be switched. Known exclusion region circuits do not have or meet the radiation hardness requirements. These systems utilize a LED light shining through a long opening to impinge on a silicon photodetector with subsequent amplification of the detected light pulse providing the main switch trigger. Due to the presence of many semiconducting elements in such a light amplification configuration, the resulting system is not radiation hard or insensitive.

SUMMARY OF THE INVENTION

Therefore, it is an object of the present invention to provide a vacuum switch system which will overcome the above-noted disadvantages.

It is a further object of the present invention to provide a vacuum switch which is insensitive to radiation.

Another object of the present invention is to provide a radiation-hard vacuum switch having an isolated trigger probe which is not connected to the switching electrodes.

A further object of the present invention is to provide a radiation insensitive vacuum switch which is accurate and precise.

Still a further object of the present invention is to provide a radiation-hard vacuum media to couple a trigger signal into an exclusion region without wires and with several kilovolts of isolation so that a capacitor discharge circuit can be switched.

Yet, still a further object of the present invention is to provide a plasmatron circuit switch which is not effected by radiation, simple in configuration and having an extended shelf life.

The foregoing objects and others are accomplished in accordance with the present invention, generally speaking, by providing a vacuum switch with an isolated trigger probe which is not directly, mechanically or electrically, connected to the switching electrodes of the switch. Such a vacuum switch is herein referred to as a plasmatron. The vacuum switch in the unit is triggered by way of plasma expansion from a trigger probe which must travel through a long opening to reach the vacuum switch elements of the plasmatron. The vacuum switch of the present invention provides a radiation hardened closing switch for a voltage applied between an anode lead and a cathode lead. More specifically, an anode lead such as niobium (Nb) and a cathode such as aluminum (Al), are spaced from each other in a vacuum to prevent arcing therebetween. A trigger pulse is applied to a trigger probe, the return side of the probe being grounded to the shell of the switch configuration, causing a plasma arc to be generated. This arc is directed by an opening or aperture in the shell of the switch to a space between the anode and cathode, causing conduction therebetween. Once the anode voltage arcs to the cathode, conduction is sustained.

BRIEF DESCRIPTION OF THE DRAWINGS

The present invention will become more fully understood from the following detailed description given herein below and the accompanying figures which are given by way of illustration only and thus are not intended to be limitative of the present invention, and wherein.

DETAILED DISCUSSION

Figure 1:
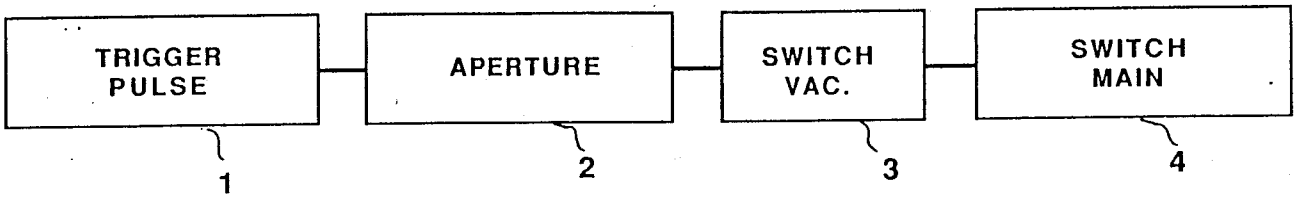
FIG. 1 represents a schematic diagram of the plasmatron circuit scheme of the present invention.

Referring now to FIG. 1 there is seen a schematic of the plasmatron circuit scheme of the present invention. The plasmatron or trigger circuit is inclusive of a trigger pulse 1, an opening or aperture 2, herein represented dimensionally as a 30 mil diameter×60 mil long opening, and the vacuum switch 3 which is triggered via plasma expansion created by the trigger pulse 1 which travels through the aperture 2 to reach the isolated vacuum switch 3. The plasma arc generated is directed by the aperture to the space between the vacuum switch anode and cathode, completing the electrical connection therebetween so as to, in turn, provide the switching action to trigger a main switch 4.

Figure 2:
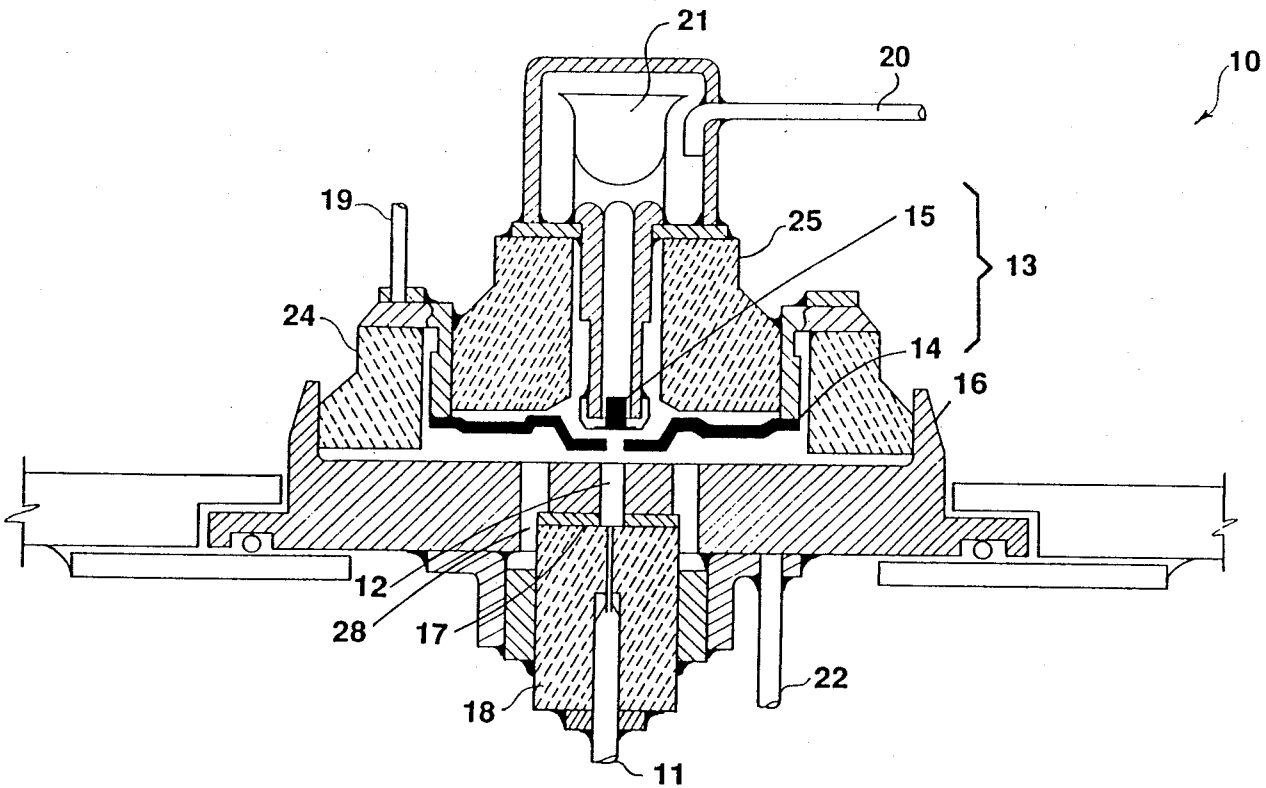
FIG. 2 represents a sectional view of the plasmatron or vacuum switch of the present invention.

FIG. 2 illustrates a sectional view of the plasmatron of the present invention. The radiation-hard vacuum switch 10, for the purposes of the present invention, is inclusive of a trigger probe 11, a connecting orifice or aperture 12, and a vacuum switch 13 including an anode 14 and a cathode 15 existing in a vacuum. Ceramic ring 24 electrically isolates anode 14 from shell 16. Ceramic ring 25 isolates the structure supporting cathode 15 from anode 14. The return of the trigger probe 11 is grounded to the shell 16 of the switch 10 through a layer of carbon 17 coating the end of the ceramic cylinder 18 through which the trigger probe 11 extends. When the switch is to close, a trigger pulse is applied to the trigger probe 11, causing a plasma arc to be generated which is directed by the aperture 12 in the shell 16 to the space which exists between anode 14 and cathode 15, causing conduction therebetween. Once the anode voltage arcs to the cathode it sustains conduction. A switch anode lead 19 and switch cathode lead 20 completes the plasmatron structure.

A vacuum is pulled through a copper tube 21 which is pinched off to hold the vacuum. Slots, not shown, are provided in the sides of the copper tube above the aluminum cathode and vent holes 23 in the shell to ensure that all gas is evacuated. The outer surface of the shell 16 is preferably gold plated to prevent the permeation of gases, typically hydrogen, through the shell. The anode 14 is corrugated to increase its surface area.

Figure 3:
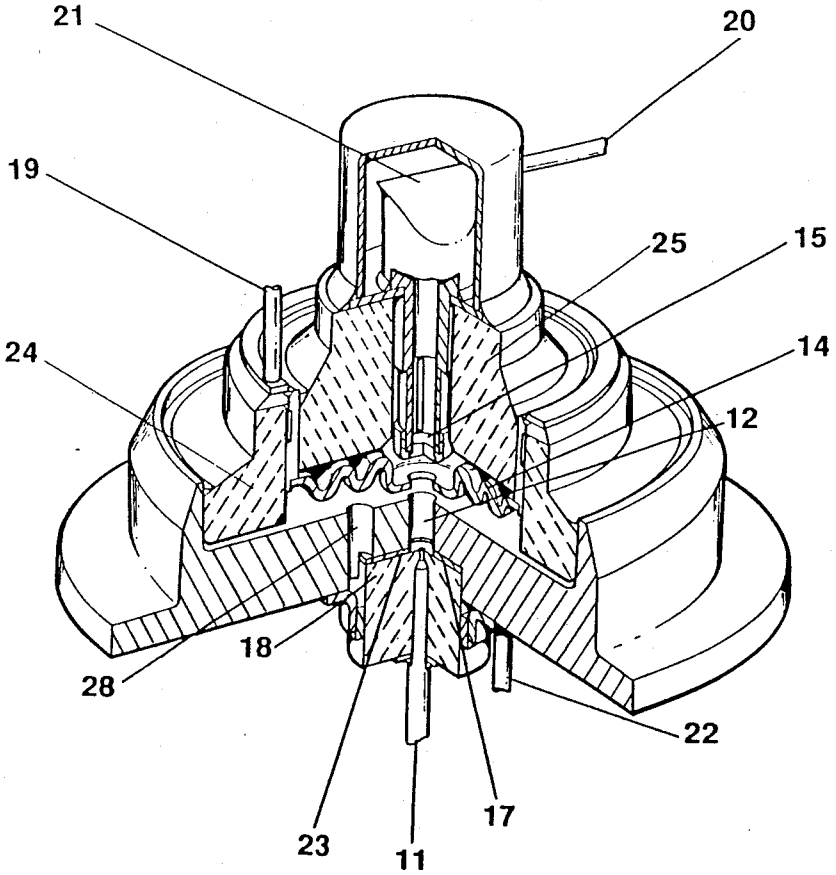
FIG. 3 represents a perspective view of the vacuum switch of FIG. 2.

Referring now to FIG. 3, there is seen a perspective view of the plasmatron or vacuum switch of the present invention. Seen in FIG. 3 is the trigger probe 11, the carbon coated ceramic 17, the isolation aperture 12 and a trigger probe return 22. The planar or vacuum switch 13 comprises the anode 14 and cathode 15. The ceramic cylinder 18 is capped by an aluminum disc 23. The planar output switch has an anode to cathode spacing of approximately 22 mils, as represented herein. A 40 mil aperture is provided in the anode to allow for the expanding of plasma to reach the cathode.

In accordance with the present invention, the plasmatron or vacuum switch provides for kilovolts of electrical isolation between a trigger probe assembly and a primary vacuum switch. Further, mechanical isolation between the trigger probe and switch is also provided by the long connecting orifice or aperture. The combination of the connecting orifice and vacuum provides the necessary electrical isolation, and radiation hardness and eliminates transmission losses between the trigger probe and the output switch. The configuration of the present invention provides a 10 shot jitter of less than 10 ns up to 300 pulses and thus the switch of the present invention is an accurate and precise switching device. Current amplification is possible within the plasmatron since the output switch can be easily designed to switch over a wide voltage range from several hundred volts to kilovolts. The plasmatron of the present invention provides an isolation feature with a single interface and without amplification stages of circuitry. Function time from the start of the trigger pulse to switch closure is approximately 60 ns. In accordance with the configuration of the present invention no chance exists for contaminants, condensation, etc. to reduce transmittance.

The particular sizes and equipment discussed above are cited merely to illustrate a particular embodiment of this invention. It is contemplated that the use of the invention may involve components having different sizes and shapes as long as the principle of directing a plasma arc to initiate a switch is followed. It is intended that the scope of the invention be defined by the claims appended hereto.

What is claimed is:

1. A radiation hardened vacuum switch system which comprises:

a shell configuration for housing the switch components switching electrodes including an anode and cathode spaced from each other in a vacuum so as to prevent arcing therebetween; and a trigger probe isolated from said vacuum switch components by an opening in said shell housing such that upon application of a trigger pulse to said trigger probe a plasma arc is generated which is directed by said opening to said space between said anode and cathode causing conduction therebetween.

2. The switch of claim 1, wherein said opening is about 30 mil diameter $\times$ 60 mil long.

3. A radiation hard vacuum switch comprising a trigger probe, a connecting orifice, and a vacuum switch including an anode and cathode existing in a vacuum, whereby upon application of a trigger pulse to said trigger probe a plasma arc is generated which is directed by said connecting orifice to a space which exists between said anode and cathode causing conduction therebetween.

4. The radiation hard vacuum switch of claim 3, further including a switch anode lead and a switch cathode lead.

* * * * *